Oct. 27, 1964  R. H. LESHER  3,154,120
ATTACHMENT FOR PORTABLE CHAIN SAWS
Filed Dec. 3, 1962  2 Sheets-Sheet 1

INVENTOR.
R. H. Lesher
Webster & Webster
ATTYS.

Oct. 27, 1964  R. H. LESHER  3,154,120
ATTACHMENT FOR PORTABLE CHAIN SAWS
Filed Dec. 3, 1962  2 Sheets-Sheet 2
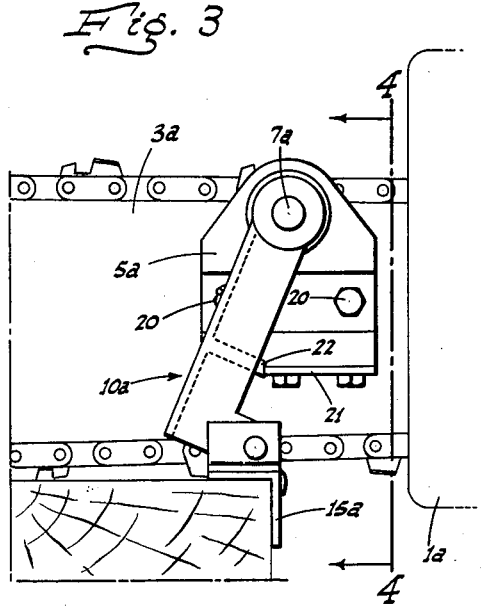
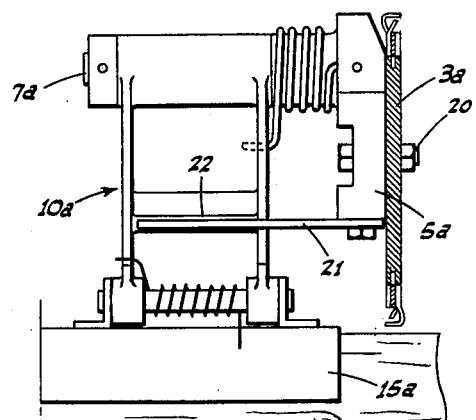
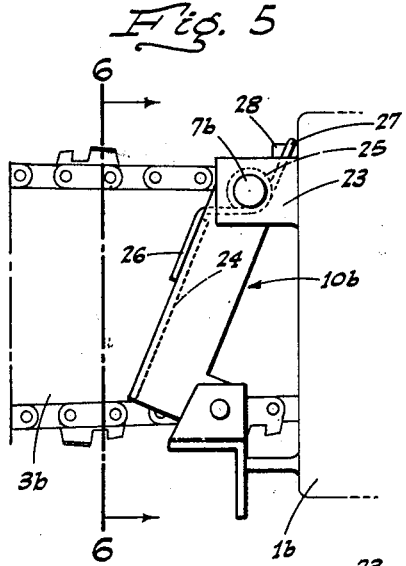
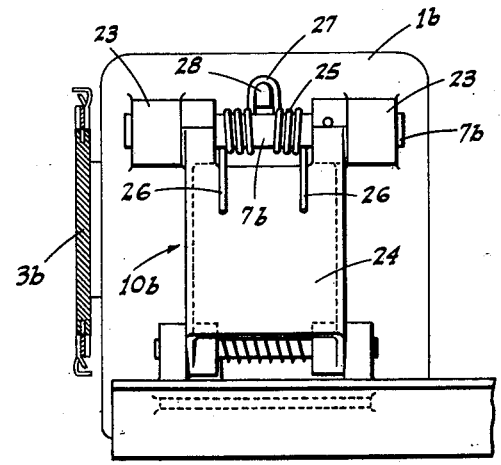
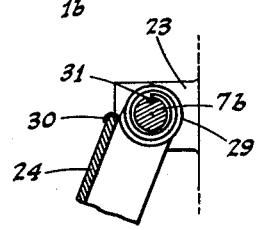

United States Patent Office 3,154,120
Patented Oct. 27, 1964

3,154,120
ATTACHMENT FOR PORTABLE CHAIN SAWS
Rutherford H. Lesher, Rte. 5, Box 1A,
Placerville, Calif.
Filed Dec. 3, 1962, Ser. No. 241,724
9 Claims. (Cl. 143—32)

This invention relates to portable saws, and particularly to power driven chain saws such as are now largely used in cutting timbers, logs, poles, and the like in out-of-door locations.

The principal object of my invention is to provide an attachment which may be readily mounted on a saw of this type, by means of which the sawing chain may be positively disposed and held, while in operation, at a definite angle to the longitudinal edge of the work being sawed, assuming that the work is being cut transversely of its length.

A further object of this invention is to arrange the attachment so that not only will the saw chain be held at the desired cutting angle transversely of the work, but the elongated thin plate-like support about which the saw chain is trained, and which corresponds to the blade of an ordinary saw, will be held at a right angle to the face of the work initially engaged by the saw chain. By reason of the above named features of the invention, a cut when made across a piece of timber will always present a cut face which will be at right angles to the length and width of the timber.

Another object of this invention is to provide an attachment for the purpose so constructed that, when applied to the work, the weight of the saw will be taken by the work even before the saw chain engages the work, and such weight will thereafter be substantially balanced by the attachment; thus making the manipulation of the saw easier for the operator to control.

A still further object of the invention is to construct the attachment so that no more or less permanent connections with the work have to be made, and the saw—together with the attachment—may be merely slid along the work from the point of one cut when made, to another point on the work where another cut, if any, is to be made.

Also, the attachment is so constructed and mounted on the saw that it will serve its purpose without change or adjustment, regardless of whether the saw is disposed with its blade horizontal, vertical, or sidewise.

It is also an object of this invention to provide an attachment for portable chain saws which is designed for ease and economy of manufacture.

These objects are accomplished by means of such structure and relative arrangement of parts as will fully appear by a perusal of the following specification and claims.

In the drawings:

FIG. 3 is a side elevation of a partly modified form of the attachment as applied to the chain supporting blade or cutter bar of a chain saw.

FIG. 4 is a rear end elevation of such attachment, taken on line 4—4 of FIG. 3.

FIG. 5 is a side elevation of a further modified form of the attachment, as applied to the front face of a chain-saw housing.

FIG. 6 is a front end elevation of such attachment, taken on line 6—6 of FIG. 5.

FIG. 7 is a fragmentary sectional view of an attachment such as that shown in FIGS. 5 and 6, illustrating a modified form of spring to engage the arm unit of the attachment.

Figure 1:
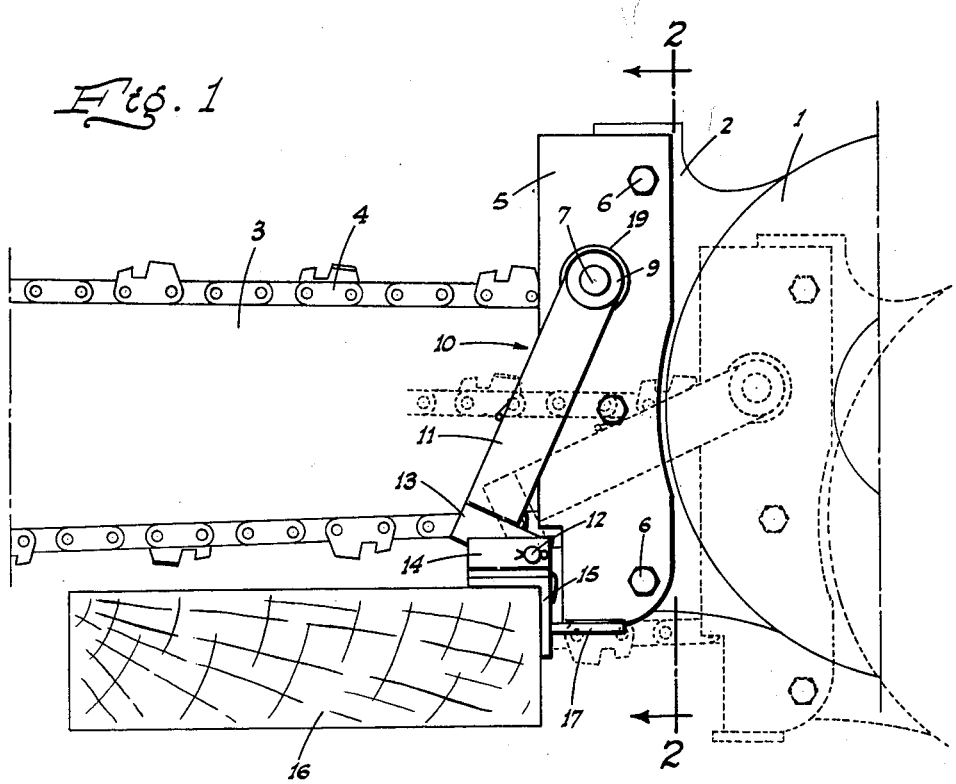
FIG. 1 is a fragmentary side elevation of a conventional portable chain saw showing my improved cut-angle controlling attachment mounted thereon and applied against one side edge of a rectangular piece of timber to be cut through transversely by the saw; the saw being shown in full lines in an initial position clear of the timber and in dotted lines in a timber engaging and cutting position.
Figure 2:
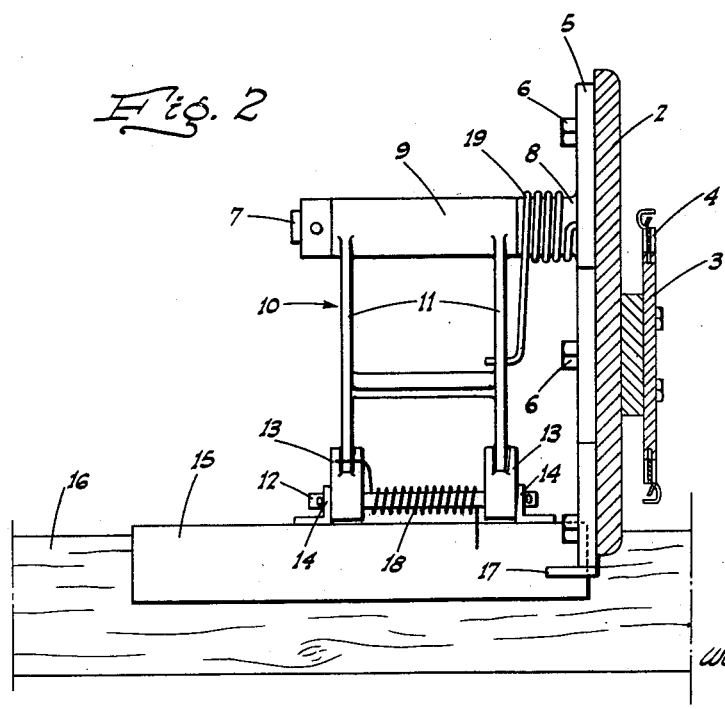
FIG. 2 is a rear end elevation of the attachment as connected to the saw housing; the latter being cut through on line 2—2 of FIG. 1.

Referring now to the drawings and to the characters of reference marked thereon—and particularly at present to the showing of FIGS. 1 and 2—the chain saw, as usual, comprises a mechanism housing 1 of one form or another, and which includes a vertical laterally disposed flat-faced flange 2 at its forward end and on one side, and an elongated thin blade or body 3 projecting forwardly from the supporting housing 1 in laterally spaced relation to the flange 2 and on the edge of which the endless saw chain 4 is mounted in the usual manner; the body 3 forming a support for the chain.

The improved angle-guide attachment, which is mounted in connection with the above described conventional arrangement of parts, comprises the following structure:

A mounting plate 5 is secured against the face of the flange 2 opposite the body 3 by cap screws 6 or the like, and depends a short distance below said body 3 and the saw chain 4 thereon. Projecting laterally out from the plate 5 a short distance from its upper end is a rigid stub shaft 7, supported in a boss 8 rigid with said plate 5.

Turnable on the shaft 7 is a sleeve 9 from which a rigid arm unit 10 depends; said unit comprising a pair of parallel arms 11 spaced apart lengthwise of the sleeve, as shown in FIG. 2. A rod 12, parallel to the shaft 7, passes through the rear ends of bearing blocks 13, which are rigid with—and project rearwardly a short distance from—the arms 11 at their lower ends. The rod 12 is supported at its ends in ears 14 mounted on the upper face of an elongated transversely extending guide bar 15 arranged to engage over the upper outer edge of a rectangular piece of timber 16 to be cut through. The bar 15 is positioned so that it terminates short of the flange 2 and the saw chain 4, while being engageable on its rear vertical face by the forwardly projecting foot 17 on the lower end of the plate 5.

A torsion spring 18 on the rod 12 between the blocks 13, and engaging at one end with one arm 11 and at the other end with the back vertical face of the bar 15, acts to yieldably urge the bar forwardly and hold it in position against the timber.

A relatively heavy torsion spring 19 is disposed about the boss 8; said spring being engaged at one end with the adjacent arm 11 and at the other end with the mounting plate 5, thus tending to yieldably swing the arm unit 10 rearwardly about the shaft as an axis, or forwardly about the rod 12 as an axis. Said spring thus controls and applies the necessary pressure through the arm unit 10 to the bar 15, and it is this pressure that keeps both the horizontal as well as the vertical sides of the guide bar 15 in constant contact with the work. In this manner, the bar is prevented from climbing up and over the top of the work as the saw chain engages the work and tends to pull the saw forwardly. In addition, the spring 19 tends to counteract and balance the rearwardly overhanging weight of the saw housing 1, and thus gives a better "feel" to the operator.

The above described parts are arranged as a whole so that when the guide bar 15 is in place, and the saw chain is clear of the timber 16, the arm unit 10 will be disposed at an acute upward angle to the rear, and the foot 17 will be engaged with the back face of the bar 15, as shown in FIG. 1. This arrangement also causes the various parts to maintain the same positions relative to each other when the saw is lifted, since the arm unit 10 and the bar 15, when disengaged from the timber, cannot swing back any material distance because of the engagement of the bar 15 with the mounting plate 5. At the same time, the arm unit 10 is maintained in a beyond-dead-center position to the rear, as is desirable to facilitate the subsequent manipulation of the saw when the bar 15 is engaged with the timber.

It will also be noted that when the attachment is disengaged from association with the timber, as above described, the bar 15 will be tilted slightly about the forwardly projecting foot 17 as a fulcrum, thus disposing the bar in a better position for initial engagement with the edge of the timber 16, since the possibility of the forward edge of said bar striking the rear edge of the timber, when the saw is being moved into cooperating relation with the timber, is lessened.

When the saw and guide bar 15 are properly located in connection with the timber, as shown in full lines in FIG. 1, downward pressure by the operator on the saw will swing the arm unit 10 downwardly and rearwardly while backing the plate 5, and the saw housing, rearwardly and downwardly at the same time. This of course causes the saw chain to engage and cut through the timber 16, as indicated in dotted lines in FIG. 1, and said chain is maintained at right angles to the timber, both in a plane transversely thereof as well as to the upper face thereof, by reason of the rigid guide bar 15.

The guide bar 15 is here shown as maintaining the saw chain at a transverse right angle to the length of the timber, but it is obvious that it may also be mounted, by means of a conventional form of quadrant unit, so that the saw chain may be disposed at other than a transverse right angle to the timber, should this be desired.

In FIGS. 3 and 4, the attachment shown is substantially the same as that hereinbefore described, but the mounting plate 5a, which supports the shaft 7a of the arm unit 10a on which the guide bar 15a is mounted, is shorter vertically than the plate 5, and is abutted directly against the saw blade 3a on one side or the other adjacent the forward end of the saw housing 1a, being rigidly secured to said blade by bolts 20.

Also, in this form of the attachment, a stop plate 21 is secured on the bottom edge of the mounting plate 5a and projects laterally out from said plate and across the arm unit 10 above the bottom thereof for normal engagement on its forward edge with the rear edge of a transverse bar 22 which connects the two arms of the arm unit 10a. The above parts obviously serve the same purpose as the guide bar engaging foot 17 of the type of device shown in FIGS. 1 and 2.

In FIGS. 5 and 6, the attachment as a whole is substantially the same as either of the previously described types. This form of the device, however, is intended more as a permanent part of the saw as manufactured, rather than as a detachable attachment. To this end, the mounting plate 5 or 5a is omitted, and bearing ears 23 for the transverse mounting shaft 7b of the arm unit 10b are formed with the front face of the housing 1b to one side of the saw blade or cutter bar 3b; said arm unit fitting between the ears, as shown in FIG. 6.

The two arms which form the arm unit 10b are connected across their front edges by a web 24 which is cut away at the top to leave a portion of the shaft 7b exposed. A dual or double-ended torsion spring 25 is disposed about the exposed portion of the shaft; the spring at its ends being formed with depending legs 26 which engage the front face of the web 24.

Centrally between its ends the spring 25 is formed with an upwardly projecting loop 27 which engages over a lug 28 formed on and projecting from the front face of the housing 1b above the shaft 7b and centrally between the ears 23. This spring arrangement gives a very even pressure against the arm unit 10b, as will be evident.

It may here be noted that a wide clock-type spring 29 could be substituted for the spring 25, as shown in FIG. 7. In this case, the outer lower end of the spring 29 is bent to engage over the upper edge of the web 24, as shown at 30, while the inner end of said spring is suitably secured to the shaft 7b as shown at 31; said shaft being then held stationary.

It will also be obvious that the saw may be used in a vertical or sideways rather than a horizontal position, as shown, should this positioning of the saw be required when performing the necessary work.

In the event that a piece of work which has no straight edges, such as a log or pole, is to be cut, a square-edged cleat for engagement with the bar 15 may be temporarily nailed on such work.

While the term "chain saw" is used herein, it is to be recognized that the device can be employed on other types of power actuated saws, such as reciprocating or "saber" saws.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An angle-guide attachment for a portable chain saw, the saw including a supporting housing and an elongated support for the saw chain projecting from and rigid with the housing; the attachment comprising an elongated angle bar extending transversely of the saw to one side of the chain support and adapted to seat over a longitudinal corner of a piece of work to be cut, said bar being initially disposed below the work engaging edge of the saw chain, and means connecting the bar to the housing and including an arm unit extending from the bar intermediate its ends to the adjacent side of the saw housing; a shaft rigid with the housing and support adjacent the housing and projecting laterally from said one side thereof and parallel to the bar and on which the arm unit at one end is pivoted, and pivot means parallel to the shaft and bar connecting the other end of the arm unit to the bar; a torsion spring acting on the arm unit to yieldably swing the same and the bar rearwardly about the shaft as an axis, and stop means initially preventing such swinging movement.

2. An attachment, as in claim 1, in which said stop means includes, with a plate rigidly secured to the saw housing and on which said shaft is mounted, a foot on the lower end of the plate initially engaging against the rear side of the bar.

3. An attachment, as in claim 1, with spring means yieldably tending to tilt the bar forwardly about the last named pivot means.

4. An angle-guide attachment for a portable chain saw, the saw including a supporting housing and an elongated support for the saw chain projecting from and rigid with the housing; the attachment comprising an elongated angle bar extending transversely of the saw to one side of the chain support and adapted to seat over a longitudinal corner of a piece of work to be cut, said bar being initially disposed below the work engaging edge of the saw chain, a mounting plate disposed at right angles to the longitudinal plane of the bar adapted to be secured against the housing to said one side of the saw support, an arm unit extending from the bar intermediate its ends laterally out from and alongside said plate, a shaft rigid with the plate and projecting laterally out therefrom parallel to the bar and on which the arm unit at one end is pivoted, pivot means parallel to the bar connecting the latter to the other end of the arm unit, spring means between the plate and arm unit tending to swing the arm unit rearwardly about the shaft, and a stop on the plate initially engaging the outer side of the bar.

5. An attachment, as in claim 4, in which said spring means tends to balance the weight of the saw when the bar is engaged with the work.

6. An attachment, as in claim 4, in which said spring means is arranged to maintain the bar in engagement with both surfaces of said corner of the work as the saw chain is depressed into the work piece.

7. An angle-guide attachment for a portable chain saw, the saw including a supporting housing and an elongated support for the saw chain projecting from and rigid with the housing; the attachment comprising an elongated angle bar extending transversely of the saw to one side of the chain support and adapted to seat over a longitudinal corner of a piece of work to be cut, said bar being initially disposed below the work engaging edge of the saw chain, and means connecting the bar to the housing and including an arm unit pivoted on and extending from the bar intermediate its ends with a rearward slope to adjacent the front face of the saw housing, ears on and projecting from said front face and between which the arm unit projects, a shaft projecting through the ears and arm unit and pivotally supporting the latter, a portion of the shaft between the sides of the arm unit being exposed to the front, a torsion spring on said exposed portion of the shaft, the opposite ends of said spring engaging the arm unit on its forward face and adjacent the sides thereof, a radially extending loop formed with the spring centrally between its ends, and a lug projecting from said front face of the housing engaged by the loop in holding relation.

8. An angle-guide attachment for a portable chain saw, the saw including a supporting housing and an elongated support for the saw chain projecting from and rigid with the housing; the attachment comprising an elongated angle bar extending transversely of the saw to one side of the chain support and adapted to seat over a longitudinal corner of a piece of work to be cut, said bar being initially disposed below the work engaging edge of the saw chain, and means connecting the bar to the housing and including an arm unit extending from the bar intermediate its ends to the adjacent side of the saw housing; a shaft rigid with the housing and support adjacent the housing and projecting laterally from said one side thereof and parallel to the bar and on which the arm unit at one end is pivoted, pivot means parallel to the shaft and bar connecting the other end of the arm unit to the bar, a torsion spring acting on the arm unit to yieldably swing the same and the bar rearwardly about the shaft as an axis, and stop means initially preventing such swinging movement; the arm unit being disposed at a rearward angle to the shaft from the last named pivot means and relative to the longitudinal plane of the chain support.

9. An angle-guide attachment for a portable saw, the saw including a sawing member and a rigid support from which the member movably projects; the attachment comprising an elongated bar adapted to engage in locating relation against one edge of a piece of work to be cut and extending transversely of the sawing member, means mounting the bar on the support and maintaining said bar rigid with the support in a direction to prevent movement of the sawing member relative to the bar at other than a predetermined angle relative to the longitudinal plane of the bar, the bar being of 90 degree form in section to engage over a corner of the work both at its rear face and at the face thereof to be engaged by the sawing member, and spring means acting on the bar mounting means to maintain the bar in pressing contact with both surfaces of the work as the sawing member is depressed into said work.

References Cited in the file of this patent
UNITED STATES PATENTS

| 2,842,168 | Truchar | July 8, 1958 |
| 3,073,073 | Van Pelt | Jan. 15, 1963 |

FOREIGN PATENTS

| 190,782 | Switzerland | July 16, 1937 |
| 495,132 | Germany | Apr. 2, 1930 |
| 691,648 | Germany | June 1, 1940 |